C. E. SIPE.
WAGON LOADER.
APPLICATION FILED FEB. 3, 1912.
1,051,020.
Patented Jan. 21, 1913.
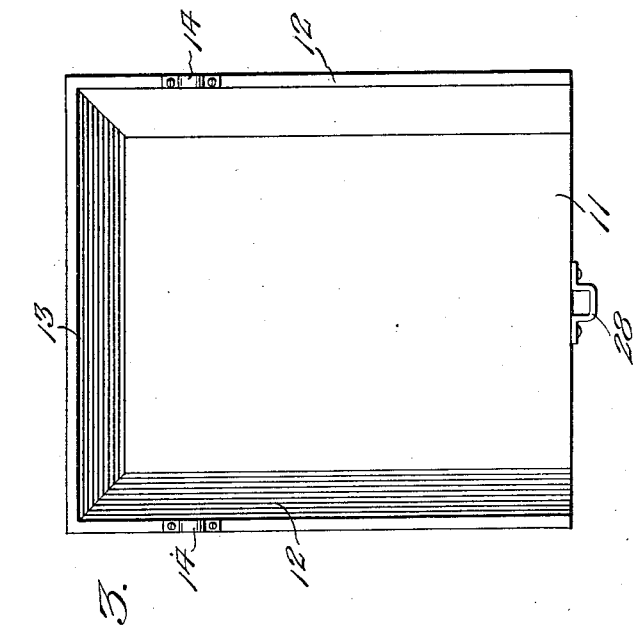
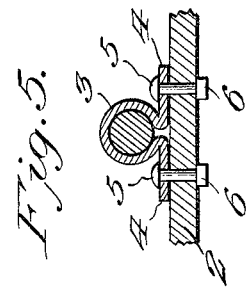
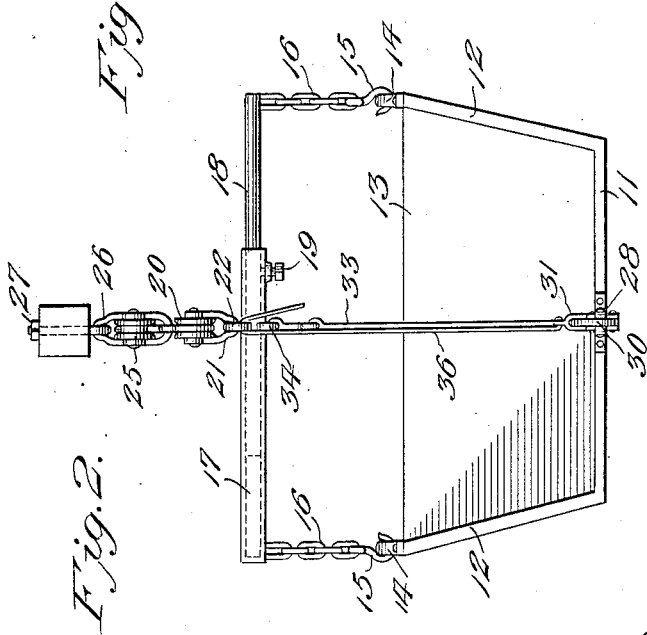
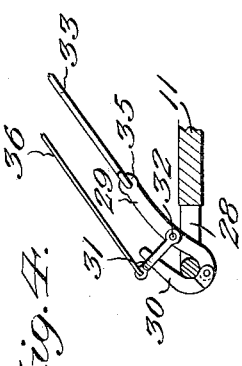
Witnesses
Edwin F. McKee
Annie I. Hind
Inventor
Charles E. Sipe
By George W. Sues
Attorney

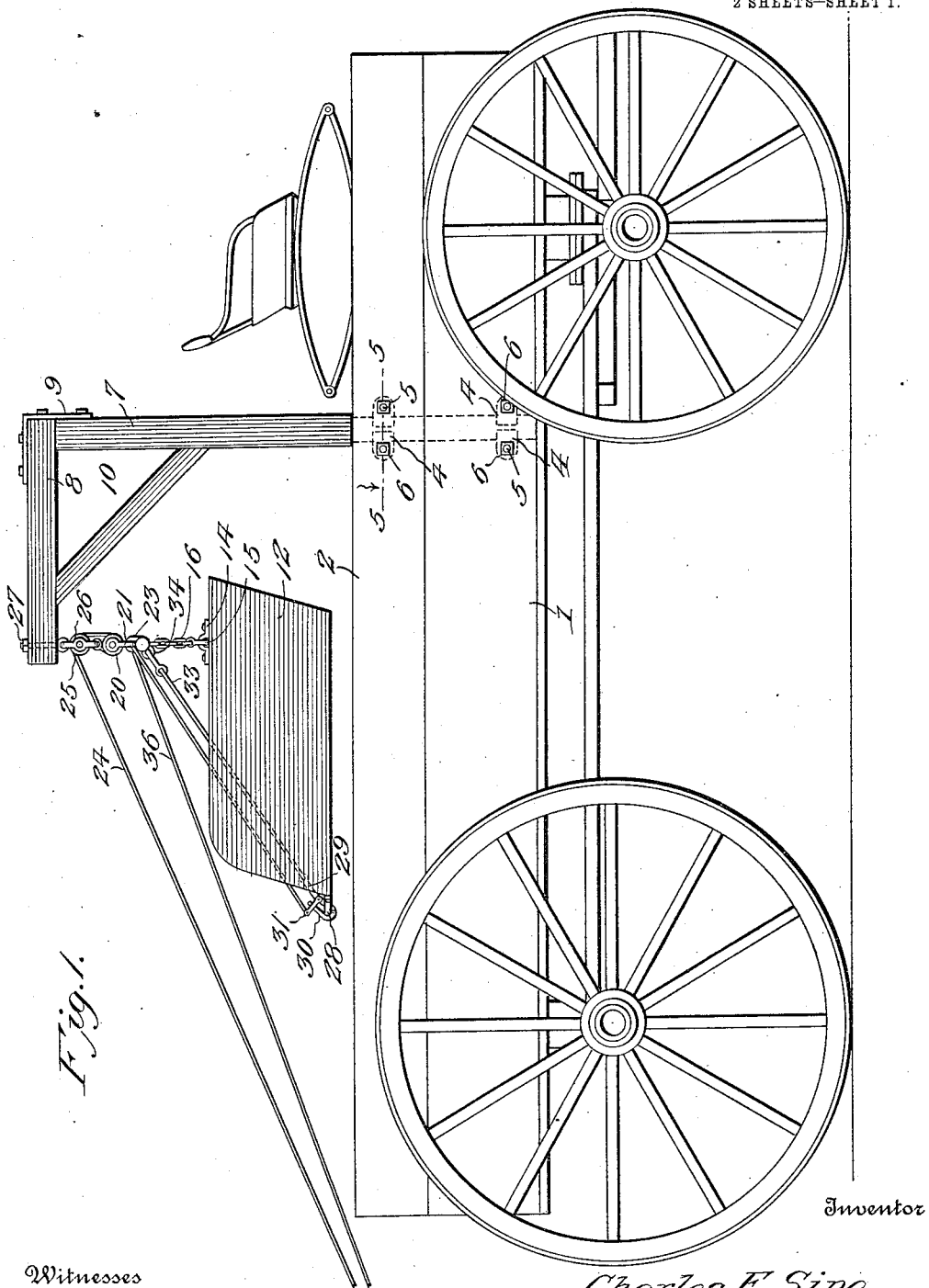

UNITED STATES PATENT OFFICE.

CHARLES E. SIPE, OF DAYTON, OHIO.

WAGON-LOADER.

1,051,020.
Specification of Letters Patent.
Patented Jan. 21, 1913.

Application filed February 3, 1912. Serial No. 675,186.

*To all whom it may concern:*

Be it known that I, CHARLES E. SIPE, a citizen of the United States, and a resident of Dayton, in the county of Montgomery and State of Ohio, have invented certain new and useful Improvements in Wagon-Loaders, of which the following is a specification, reference being had to the accompanying drawings.

This invention relates to wagon loading devices and more particularly to a device for loading wagons with corn, in the field, and the object of the invention is to provide a device for this purpose by the use of which corn may be more expeditiously loaded and with less stooping and bending and labor on the part of the farmer than by the ordinary modes of loading by hand.

One aim of the present invention is to provide a device of the class described which may be readily applied to the side board of any ordinary farm wagon such as is employed in loading corn in the field and which may be readily detached after the wagon has been loaded so that it need not be carried with the load.

Another aim of the invention is to provide a wagon loading device for the purpose stated which may be operated by one man and will not require an attendant in the wagon, the loading and dumping operations of the device being readily controlled from the ground.

The invention aims further to so construct the device that it may not only be applied to any ordinary farm wagon, but may be readily adapted for the loading of a greater or less bulk of corn at a time.

With these and other objects in view, the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification and in which like numerals of reference indicate similar parts in the several views: Figure 1, is a view in side elevation of the device mounted upon a farm wagon. Fig. 2 is a front elevation of the device removed from the wagon. Fig. 3, is a top plan view of the scoop of the device. Fig. 4, is a detail view partly in side elevation and partly in section of the trip device for dumping the scoop. Fig. 5, is a detail horizontal sectional view on the line 5—5 of Fig. 1.

In Fig. 1 of the drawings, the device is illustrated as mounted upon an ordinary farm wagon such as is used in carrying the husked corn from a field. This wagon is indicated in general by the numeral 1 and its side boards by the numeral 2. For a purpose to be presently explained there are secured upon the inner side of one of the side boards 2, near the forward end thereof, a pair of clips such as shown in Fig. 5. Each of these clips is preferably formed from a suitable length of strap iron having its intermediate portion bent to form an annular loop 3 and its end portions extending in opposite directions to form attaching ears 4. The clips are located one above the other and are secured in place by means of bolts 5 passed through the attaching ears and the said side board of the wagon body, and having threaded thereon nuts 6 which bear against the outer side of the said side board.

The loading device of the present invention includes a crane consisting of a standard 7 to the upper end of which is secured the inner end of an arm 8, the connection between the standard and arm being braced by means of an angle iron 9 and a brace 10, as shown in Fig. 1 of the drawings. The standard 7 has its lower end portion rounded and revolubly fitted in the loops 3 of the clips, before described, so that it is supported for rotation about a vertical axis and so that the arm 8 may be swung to position to extend beyond the side of the wagon body or above the same.

The scoop or basket into which the husked corn is to be deposited by the huskers comprises a bottom 11, upwardly and outwardly inclined sides 12, and an upwardly and rearwardly inclined back 13, it being open at its front as clearly shown in Figs. 2 and 3. Secured to the upper edge of each of the sides 12 of the scoop near the rear end thereof is a clip 14, and detachably engaged with each of these clips is a hook 15 carried at the lower end of a short chain 16. These chains 16 are supported from the ends of a bar which is adjustable as to length and comprises a section 17 and a section 18, the section 18 being telescopically fitted in the section 17, as shown in Fig. 2 of the drawings and being held at adjustment by means of a set screw 19 threaded through the section 17 and bearing against the section 18. As shown in the said figure, the chains 16 are supported from the outer ends of the sections of the rod, and it will be readily understood that by adjusting the rod, it and the chains may be adapted to support scoops of different widths, depending upon the bulk of corn to be loaded into the wagon at a time.

In order to support the scoop from the arm 8 of the crane, a pulley 20 has its hanger 21 connected as at 22 to an eye 23 formed or secured upon the section 17 of the rod, above described, near the inner end thereof, and about this pulley is trained a hoisting cable 24 having one end connected as at 25 to the hanger of a pulley 26 supported by means of an eye bolt 27 from the outer end of the said arm 8 of the crane. It will be observed from an inspection of Fig. 1 of the drawings that the cable 24 is trained over the pulley 26, also, and that it may be manipulated by a person standing on the ground beside the wagon. It will be understood at this point that when the scoop is to be loaded, the arm of the crane is swung around so that it will extend beyond the wagon and that the cable 24 is to be slackened so as to lower the scoop into position upon the ground. After the scoop has been loaded, it is to be elevated by means of the cable 24 and the arm of the crane is then to be swung to extend above the bed of the wagon after which the scoop is to be dumped, and means, which will now be described, is provided for holding the scoop level while being elevated and for dumping it after it is in position over the wagon.

To the forward edge of the bottom 11 of the scoops is secured a hasp 28 with which is engaged a trip hook comprising a shank 29 and a bill 30 which is pivoted to the shank and is normally held closed and in engagement with the hasp by means of a U-shaped keeper 31 which is pivoted to the shank as at 32 and engages with the bill 30 in the manner shown in Fig. 4 of the drawings. A cable 33 is connected at one end to an eye 34 upon the section 17 of the rod which supports the scoop of the device and at its other end as at 35 to the shank 29 of the trip hook. In this manner, the forward or open end of the scoop is supported while the scoop is being elevated to position above the wagon box. In order that the keeper 31 may be disengaged from the bill of the trip hook for the purpose of releasing the forward end of the scoop, a pull rope 36 is connected at one end to the said keeper and is passed through the eye 22 and then led beside the rope 24 so as to be within convenient reach of the operator of the device.

From the foregoing description of the invention, it will be readily understood that a number of the scoops are to be distributed about the field from which the husked corn is to be hauled and that as these scoops are filled by the huskers, the wagon carrying the device of the present invention is driven to position beside the scoops and they are elevated to position above the wagon bed and their contents dumped.

Having thus described my said invention, what I claim as new and desire to secure by United States Letters Patent is:

1. In a device of the class described, a swinging support, a bar supported therefrom and adjustable as to length, a scoop supported near one end from the ends of the bar, and a trip device for supporting the other end of the scoop.

2. In a device of the class described, a support, a bar suspended from the support and comprising telescoped sections, a scoop supported near one end from the ends of said bar, a cable for raising and lowering the bar, a trip device for supporting the other end of the scoop, and an operating rope connected with the trip device.

3. In a device of the class described, a support, a scoop supported from the support near one end, a trip device supporting the other end of the scoop, said trip device comprising a hook having a shank and a bill pivoted thereto and engaged with the scoop, a keeper for the said bill, and a releasing rope connected to the keeper.

4. In a device of the class described, a support, a scoop, means supporting the scoop near one end from the support and operable to raise and lower the scoop, said means comprising a pulley carried by the support, a bar connected at its ends with the scoop near one end of the latter, and a hoisting cable connected with the bar and trained over the pulley, an eye at the other end of the scoop, a trip hook comprising a shank and a bill pivoted thereto and engaged with the said eye, a keeper for the bill of the hook, and a pull rope connected to the keeper and trained through an eye upon the said bar.

In testimony whereof I affix my signature, in presence of two witnesses.

CHARLES E. SIPE.

Witnesses:
 LEE MARKEY,
 BERTHA SCHULZE.

Copies of this patent may be obtained for five cents each, by addressing the "Commissioner of Patents, Washington, D. C."